April 23, 1963 J. R. RUHLMAN 3,087,008
CORONA SUPPRESSING ENDS FOR APPLIANCES
FOR ELECTRICAL CONDUCTORS
Filed Sept. 29, 1960
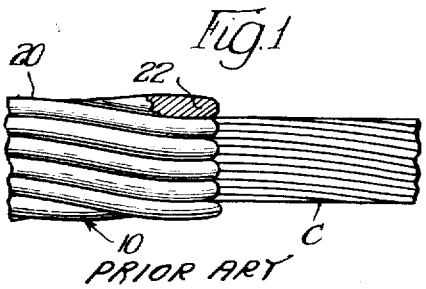
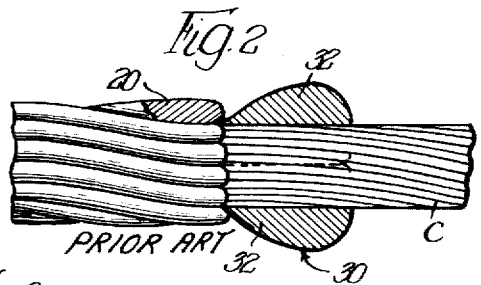
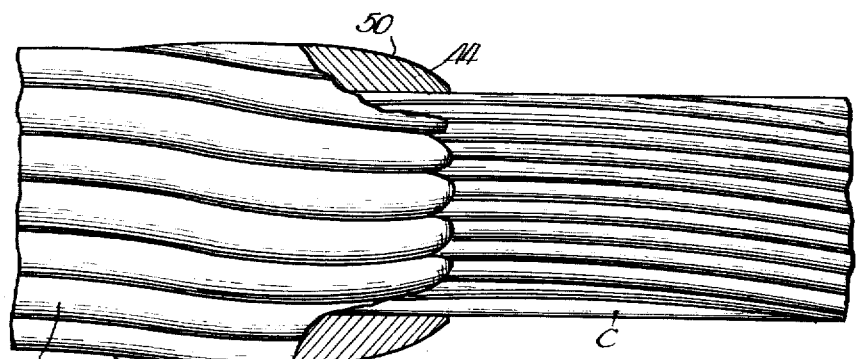
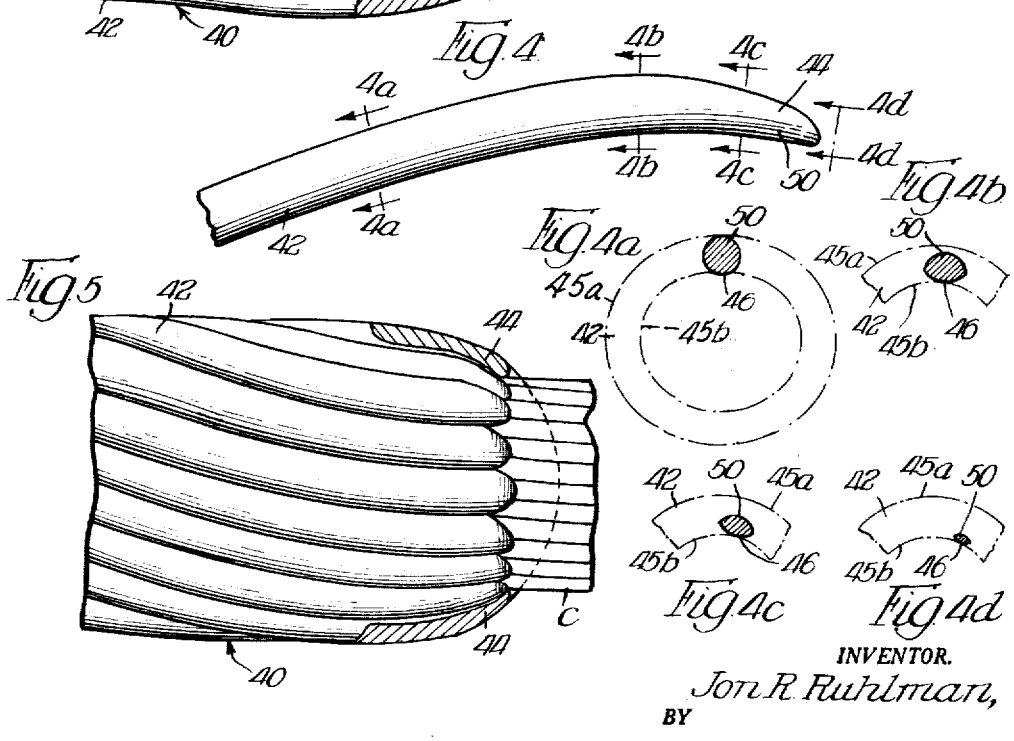
INVENTOR.
Jon R. Ruhlman,
BY United States Patent Office 3,087,008
Patented Apr. 23, 1963

3,087,008
CORONA SUPPRESSING ENDS FOR APPLIANCES FOR ELECTRICAL CONDUCTORS
Jon R. Ruhlman, Cleveland, Ohio, assignor to Preformed Line Products Company, Inc., Cleveland, Ohio, a corporation of Ohio
Filed Sept. 29, 1960, Ser. No. 59,411
8 Claims. (Cl. 174—135)

This invention relates to appliances especially suited for use in conjunction with suspended linear bodies particularly electrical conductors, and more specifically, relates to an improvement for such appliances that eliminates or at least substantially minimizes corona emission.

During the last several years numerous appliances have been invented which embody the concept of forming a wire or a strip into a helix prior to application to an electrical conductor, or some similar linear body. The wire is formed into a helix having sufficient pitch length and internal diameter that it may be applied to the conductor from the side without exceeding the elastic limit of the wire. Appliances embodying this concept take the form of splices, armor sheaths, dead ends, hangers, vibration dampers, bridging apparatus, and so forth. Examples of such appliances are shown in the patents to Peterson Nos. 2,275,019, 2,587,521, 2,722,393, 2,736,398 2,744,707 and 2,761,273.

These appliances have been extremely successful in their commercial development due to certain unique advantages over prior art devices that are designed for the same purpose. For example the helically shaped rods are relatively inexpensive and may be readily applied to a conductor. Moreover, the helically shaped rods when applied to a linear conductor have a longitudinal gripping strength which exceeds the strength of the line when designed along certain specifications. At the same time, the helically shaped rods are flexible and resilient so as to minimize mechanical stress concentration, conductor chafing, and other characteristics that are conducive to to conductor failure. The helically shaped elements, due to their natural resiliency and flexibility, also act as vibration dampers for the lines to which they are applied.

One of the problems encountered in suspended electrical conductors, particularly those used for transmission of electrical energy at high voltages, is electrical discharge to the surrounding atmosphere, commonly called corona discharge. The primary objections to corona discharge are its interference with electromagnetic wave transmission such as radio and television reception and the lowered transmission efficiency of the conductor. Corona discharge occurs when the molecules of gas surrounding the conductor become ionized and is a function of the surface density charge on the conductor. If the conductor has some irregularity, such a a sharp projection or contour, bur or scratch, the irregurality naturally becomes highly stressed electrically so as to have a high surface density charge. For that reason, it is desirable to eliminate any sharp irregularities wherever possible.

Most of the appliances used in conjunction with suspended electrical conductors, due to the requirements for which they are designed to meet, inherently result in some abrupt projection from the line which causes an area of electrical stress concentration. For that reason it is necessary to use some auxiliary device in conjunction with the appliance for suppressing the corona discharge. This practice is obviously objectionable since the auxiliary device necessitates additional cost and also involves increased effort in applying it to the conductor.

For these reasons, I have invented helically formed rods for use in the construction of various appliances as mentioned previously, which eliminate the necessity of utilizing some auxiliary device for suppressing the surface electrical stress gradient and the resulting corona discharge. Briefly, the invention comprises constructing the helically formed rods so that for a substantial length adjacent the ends thereof the portion of the rod periphery adjacent the outer periphery of the helix longitudinally converges along an arcuate path toward the inner periphery of the helix. At the very end of the rod the outer portion of the rod periphery will be in substantially touching relationship with the conductor to which the rod is applied. It should be noted that in no way does the invention interfere with the effectiveness or efficiency of the helical rods in their primary use as part of an appliance.

A foremost feature and object of the invention resides in the provision of an electrical appliance for suspended electrical conductors, utilizing rods which are helically shaped prior to application to a conductor and which minimize electrical stress concentration, and the resulting corona emission.

Another object of the invention resides in the provision of helical rods for use in conjunction with suspended electrical conductors, which eliminate the necessity of utilizing appliances in conjunction therewith that are specifically designed to suppress corona emission.

Another object of the invention resides in the provision of an appliance constructed at least in part of rods helically formed prior to application to an electrical conductor which minimize or eliminate corona emission, and which, at the same time, result in a substantial saving in labor and cost over methods used heretofore for suppression of corona emission.

These and other objects of the invention will be apparent upon reading of the specification with reference to the following drawing:

In the drawing—

FIGURES 1 and 2 are representative illustrations partly in section, partly in elevation, of prior art devices utilizing rods helically formed prior to application to an electrical conductor;

FIGURE 3 is a view partly in section, partly in elevation, of the helically formed rods embodying the invention;

FIGURE 4 is an elevational view of one of the helical rods constructed in accordance with the invention;

FIGURES 4a through 4d are sectional views taken along the sectional lines 4a through 4d in FIGURE 4;

FIGURE 5 is an elevational view of the appliance embodying the invention.

It will be apparent upon reading of the specification that the rods embodying the invention may be constructed of any suitable material having the physical characteristics that will provide the properties desired. Normally, the rods will be constructed of some metallic substance such as iron or steel, aluminum, galvanized iron, copper, brass, and the like. In the drawing only fragmentary portions of the rods are shown to illustrate the invention. The remainder of the rods may be formed in any suitable manner to form whatever appliances are desired. Thus the illustrations shown are merely for exemplary purposes and are not to be construed as limitations.

Referring now to FIGURE 1, there is shown a sheath of rods constructed in accordance with the prior art, generally designated by the numeral 10, and applied to a conductor C of some suitable type. The conductor may be either stranded, or constructed of a single element. The sheath 10 is constructed of a plurality of rods 20 formed to a helical shape prior to application to the conductor C. As set forth in the previously mentioned Peterson patents, the helical construction is of a sufficient pitch length and internal diameter that the rods 20 may be applied to the conductor without substantially exceeding the elastic limit of the rods. When a full complement of the rods 20 is applied to the conductor C, they form a tubular envelope, or sheath, which completely encloses the conductor C.

It has been the practice in the past to ball-end the ends of the rods 20 as shown in FIG. 1 and, specifically, the end in cross-section designated by the numeral 22. The ball-ending removes any burs or sharp projections which are incurred as a result of the cutting of the rods, and which would be conducive to corona emission. It has been found that in the lower range of voltages the rods 20 when ball-ended, as previously described, do not present any serious problem with regard to corona emission. However, at higher voltages the stress concentration is sufficient to ionize the surrounding air so that there is a corona discharge. For this reason it is necessary to use auxiliary devices having a substantially larger radius contour so as to eliminate points of stress concentration.

One of the devices prevalently used are end spheres of the type shown in FIGURE 2, and generally denoted by the numeral 30. The end spheres 30 consist of the two halves 32 which when placed in mating relationship form a substantially pear-shaped construction. The narrow end of the construction is embraced by the ends of the rods 20 when the latter are applied to the conductor C so as to hold the halves 32 in their mating relationship. The exposed or wide ends of the halves 32 have a large radius of curvature so that the electrical stress which would normally be in the ends of the rods 20 may now be spread out over a much greater area and thus lessen the electrical differential with the surrounding atmosphere. While this device is successful in minimizing corona emission, it does necessitate the utilization of an auxiliary appliance in conjunction with that constructed from the rods 20 and at the same time complicates the application of the latter to the conductor C.

Referring now to FIGURES 3 and 5, there are shown fragmentary views of an appliance constructed in accordance with the subject invention generally denoted by the numeral 40. As mentioned previously, the appliance may take any one of several forms, or be of any of several types with only a sufficient portion being shown to fully disclose the invention and to demonstrate that the invention may be applied to substantially all appliances constructed of helically formed rods. The appliance is constructed of the rods 42, which have been helically formed in the manner previously described prior to application to the conductor C. The conductor C as mentioned previously may be either stranded or of a single strand when used in conjunction with the invention.

The rods 42 have been provided with the end portions 44 of diminishing cross section, as shown in FIGURES 3 and 5. The end portions 44 are constructed so that when the rods 42 are assembled around the conductor C the exposed portion of their peripheries lie generally along a sphere or spheroidal shape, as will be explained in greater detail hereinafter. It is apparent that the rate of diminution may be varied so that the end portions 44 fall along a spherical path, as mentioned previously, or along an ovate path having a polar axis either greater or shorter than the combined diameter of the conductor C and the rods 42. Generally, the polar axis will be at least as great as the combined diameter of the conductor and rods so as to obtain as much corona suppressive effect as possible.

Referring now to FIGURE 4, there is shown a single element, or rod 42, constructed in accordance with the subject invention. In the end portion 42 the portion of the rod periphery adjacent the outside periphery of the helix converges toward the inside periphery of the helix, as can be seen in FIGURE 3. It can also be seen that the path of convergence is arcuate, and is generally spherical, as previously described. This converging relationship can also be seen by referring to FIGURES 4a through 4d.

In FIGURE 4a there is shown a cross-section taken at a point remote from the end of the rod 42 and which is not diminished. At such point the rod is of a uniform diameter and of a circular construction. The outside and inside peripheries of the helix are indicated by the dot and dash lines and denoted by the numerals 45a and 45b, respectively.

In FIGURE 4b, there is shown a section taken at a point where the diminution begins. At this point, it can be seen that the portion 46 of the rod 42 adjacent the inner periphery of the helix 45b is slightly flattened so that it is not symmetrical with respect to the portion 46 of the rod that is adjacent to the outer periphery 45a of the helix. As a result, the portion 50 in FIGURE 4b is slightly closer to the portion 46 and to the inside helical periphery 45b than in FIGURE 4a.

Referring now to FIGURE 4c, there is shown a cross-section taken at a point further along the end portion 44. It can be seen that the portion 46 adjacent the inner periphery 45b of the helix is substantially flattened and so that the portion 50 is much closer to the inside periphery 45b than in FIGURES 4a and 4b.

In FIGURE 4d, which is an end view, the portion 50 is almost in touching relationship with the portion 46. At this point, it can be seen that the cross-section of the rod is ellipsoidal in shape having a very small minor axis which is radial with respect to the helix and a much larger major axis. As a matter of fact, at the extreme end of the rod 42, the minor axis will approach zero, so that the portion 50 is in substantially touching relationship with the surface of the conductor to which it is applied.

The configuration of the rod ends may also be described in terms of the helical diameters. Each helically former rod has internal and external helical diameters with the difference being the thickness of the rod. Thus in the portion adjacent the end of the rod the external diameter would gradually diminish relative to the internal diameter until they are substantially the same, whereas in the remaining portions of the rod the diameters would be substantially parallel. The internal diameter would remain relatively fixed or at least when the rod is applied to a conductor the internal diameter normally would be substantially the same as the diameter of the conductor.

It is apparent that the length of the path of convergence followed by the outer peripheral portion 46 may be made as long as desired within the limits of reason, so that the ends are gently curved or more rapidly curved. Thus the rate of diminution may be designed to fit the particular needs of the system.

As a result of this invention, it is possible to substantially suppress corona discharge to the same extent as with many auxiliary devices now commonly used, such as the end sphere described and shown in FIGURE 2. Thus the auxiliary devices may be eliminated. Moreover, it can be seen that the subject invention does not complicate the installation of the helical rods to a conductor nor interfere with their operation.

Although certain specific terminology was used in the specification, it is to be understood that it was merely by way of example and not to be construed as a limitation. It will be apparent that certain modifications may be made within the scope of the claims without departing from the spirit of the invention.

It is claimed:

1. An appliance adapted for use in conjunction with a suspended linear body such as an electrical conductor comprising a helically shaped rod of open pitch and diameter adapted to be wrapped around a linear body to be coextensive therewith for a portion of the latter's length, said rod being formed adjacent and including its end with a surface whose outermost contour lies along a curve which converges with the helical axis toward said end and lies on a spheroidal surface of revolution generated about said helical axis.

2. The combination comprising a suspended linear body such as an electrical conductor, and a reinforcement rod secured to said linear body and being coextensive and axially parallel with a portion of said linear body's length, said rod being formed adjacent and including its end with a surface whose outermost contour lies along a curve which converges with the axis of said linear body toward said end and lies on a spheroidal surface of revolution generated about said axis.

3. An appliance adapted for use in conjunction with a suspended linear body such as an electrical conductor comprising a helically shaped rod of open pitch and diameter adapted to be wrapped around a linear body to be coextensive therewith for a portion of the latter's length, said rod being formed for a portion of its length adjacent and including its end with a surface whose outermost contour lies along a curve which converges with the helical axis toward said end and lies on a surface of revolution generated about said helical axis and whose innermost contour lies along a line substantially parallel with said helical axis.

4. An appliance adapted for use in conjunction with a suspended linear body such as an electrical conductor comprising at least one helically shaped rod adapted to be wrapped around a linear body to be co-extensive therewith for a portion of the latter's length, said helically shaped rod having external and internal helical diameters with the difference being the thickness of the rod, said rod having at least one portion adjacent to and including at least one end in which the external diameter gradually diminishes relative to the internal diameter with the latter remaining substantially constant.

5. An appliance as defined in claim 4 in which the external diameter is smallest at said one end and in which said external diameter diminishes along a curved path.

6. An appliance as defined in claim 5 in which said portion is further characterized as being ellipsoidal in transverse cross section with the peripheral portion of the rod adjacent the outer periphery of the helix having a substantially greater cross sectional radius of curvature than the remaining portion of the rod periphery.

7. An appliance as defined in claim 6 in which said external diameter is substantially equal to said internal diameter at said one end of said rod.

8. An appliance adapted for use in conjunction with a linear body such as an electrical conductor comprising at least one helically shaped rod adapted to be wrapped around a linear body to be co-extensive therewith for a portion of the latter's length, said helically shaped rod having external and internal helical diameters with the difference being the thickness of the rod, said rod having at least one portion adjacent and including at least one end in which the external diameter gradually diminishes relative to the internal diameter with the latter being adapted to be substantially the same throughout said portion as the diameter of the linear body when applied thereto

References Cited in the file of this patent

UNITED STATES PATENTS 2,934,595    Earle                  Apr. 26, 1960

UNITED STATES PATENT OFFICE
CERTIFICATE OF CORRECTION

Patent No. 3,087,008  April 23, 1963

Jon R. Ruhlman

It is hereby certified that error appears in the above numbered patent requiring correction and that the said Letters Patent should read as corrected below.

Column 1, line 54, for "a", first occurrence, read -- as --; line 55, for "bur" read -- burr --; column 3, line 7, for "burs" read -- burrs --; column 4, line 31, for "former" read -- formed --.

Signed and sealed this 5th day of November 1963.

(SEAL)
Attest:
ERNEST W. SWIDER

Attesting Officer

EDWIN L. REYNOLDS

Acting Commissioner of Patents